United States Patent
Xu

(10) Patent No.: US 9,658,769 B2
(45) Date of Patent: May 23, 2017

(54) TOUCH SCREEN KEYBOARD DESIGN FOR MOBILE DEVICES

(75) Inventor: Xiaorui Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 728 days.

(21) Appl. No.: 13/997,013

(22) PCT Filed: Dec. 22, 2010

(86) PCT No.: PCT/CN2010/002130
§ 371 (c)(1),
(2), (4) Date: Oct. 15, 2013

(87) PCT Pub. No.: WO2012/083499
PCT Pub. Date: Jun. 28, 2012

(65) Prior Publication Data
US 2015/0046865 A1  Feb. 12, 2015

(51) Int. Cl.
G06F 3/0481 (2013.01)
G06F 3/0488 (2013.01)
G06F 3/0484 (2013.01)

(52) U.S. Cl.
CPC ...... *G06F 3/04886* (2013.01); *G06F 3/04842* (2013.01)

(58) Field of Classification Search
None
See application file for complete search history.

(56) References Cited

U.S. PATENT DOCUMENTS 8,866,764 B2 * 10/2014 Schrock .............. G06F 3/04886
345/1.1
2006/0033724 A1 * 2/2006 Chaudhri .............. G06F 3/0482
345/173

(Continued)

FOREIGN PATENT DOCUMENTS

CN    1704871 A  * 12/2005  ............... G06F 3/00
CN    1704871 A    12/2005

(Continued)

OTHER PUBLICATIONS

International Search Report and Written Opinion received for PCT Patent Application No. PCT/CN2010/002130, mailed on Oct. 13, 2011, 11 pages.

(Continued)

*Primary Examiner* — Phenuel Salomon
(74) *Attorney, Agent, or Firm* — Barnes & Thornburg

(57) ABSTRACT

Methods, apparatuses, and articles of manufacture for a virtual touch screen keyboard. The method includes waiting for a movement of a mobile device. Upon movement of the device, the keyboard receives a measurement representing a position of the device from a sensor of the device. The keyboard determines whether an absolute value of the received measurement is greater than a pre-defined value. If the absolute value of the received measurement is greater than the pre-defined value, and the received measurement is negative, the keyboard displays a first portion of the virtual touch screen keyboard. If the absolute value of the received measurement is greater than the pre-defined value, and the received measurement is positive, the keyboard displays a second portion of the virtual touch screen keyboard. The first portion and the second portion of the virtual touch screen keyboard provide keys that are at least double in size to the keys provided on a conventional touch screen keyboard.

30 Claims, 10 Drawing Sheets

(56) References Cited

U.S. PATENT DOCUMENTS

| | | | |
|---|---|---|---|
| 2007/0013673 A1* | 1/2007 | Minari | G06F 3/04886 345/173 |
| 2008/0247128 A1* | 10/2008 | Khoo | G06F 1/1616 361/679.04 |
| 2008/0284744 A1 | 11/2008 | Park et al. | |
| 2009/0278806 A1* | 11/2009 | Duarte | G06F 3/0416 345/173 |
| 2010/0053089 A1* | 3/2010 | Kwok | G06F 3/04886 345/173 |
| 2010/0085274 A1* | 4/2010 | Kilpatrick, II | G06F 1/1616 345/1.3 |
| 2010/0174421 A1* | 7/2010 | Tsai | G06F 1/1616 700/302 |
| 2011/0063224 A1* | 3/2011 | Vexo | G06F 3/04886 345/168 |
| 2011/0210922 A1* | 9/2011 | Griffin | G06F 1/1624 345/173 |
| 2011/0242138 A1* | 10/2011 | Tribble | G06F 3/04886 345/663 |

FOREIGN PATENT DOCUMENTS

| | | | | |
|---|---|---|---|---|
| CN | 101384977 A | | 3/2009 | |
| CN | 101581973 A | | 11/2009 | |
| CN | 101620474 A | | 1/2010 | |
| CN | 101763200 A | | 6/2010 | |
| CN | 101770330 | | 7/2010 | |
| CN | 101770330 A | * | 7/2010 | G06F 3/048 |
| CN | 101770330 A | | 7/2010 | |
| JP | 2003-316502 A | | 11/2003 | |
| JP | 2008-140064 A | | 6/2008 | |
| JP | 2010282459 A | * | 5/2009 | G06F 3/041 |
| JP | 2010-140321 A | | 6/2010 | |
| JP | 2010-282459 A | | 12/2010 | |
| WO | 2012/083499 A1 | | 6/2012 | |

OTHER PUBLICATIONS

International Preliminary Report on Patentability received for PCT Patent Application No. PCT/CN2010/002130, issued on Jun. 25, 2013, 6 pages.

Office Action Received for Japanese Patent Application No. 2013-543483, mailed on Nov. 4, 2014, 2 pages of Japanese Office Action and 2 pages of English Translation.

Office Action Received for Japanese Patent Application No. 2013-543483, mailed on Feb. 4, 2014, 3 Pages of Japanese Office Action and 4 Pages of English Translation.

Office Action Received for Korean Patent Application No. 10-2013-7015434, mailed on Apr. 30, 2014, 5 Pages of Korean Office Action and 5 Pages of English Translation.

Office Action Received for Chinese Patent Application No. 201080070872.5, mailed on Jun. 2, 2015, 19 Pages of Office Action. (12 Pages of English translation).

Office Action Received for Chinese Patent Application No. 201080070872.5, mailed on Jan. 7, 2016, 14 Pages of Office Action and 5 Pages of English Translation.

Office Action received for Chinese Patent Application No. 201080070872.5, mailed on Jun. 14, 2016, 11 pages.

* cited by examiner

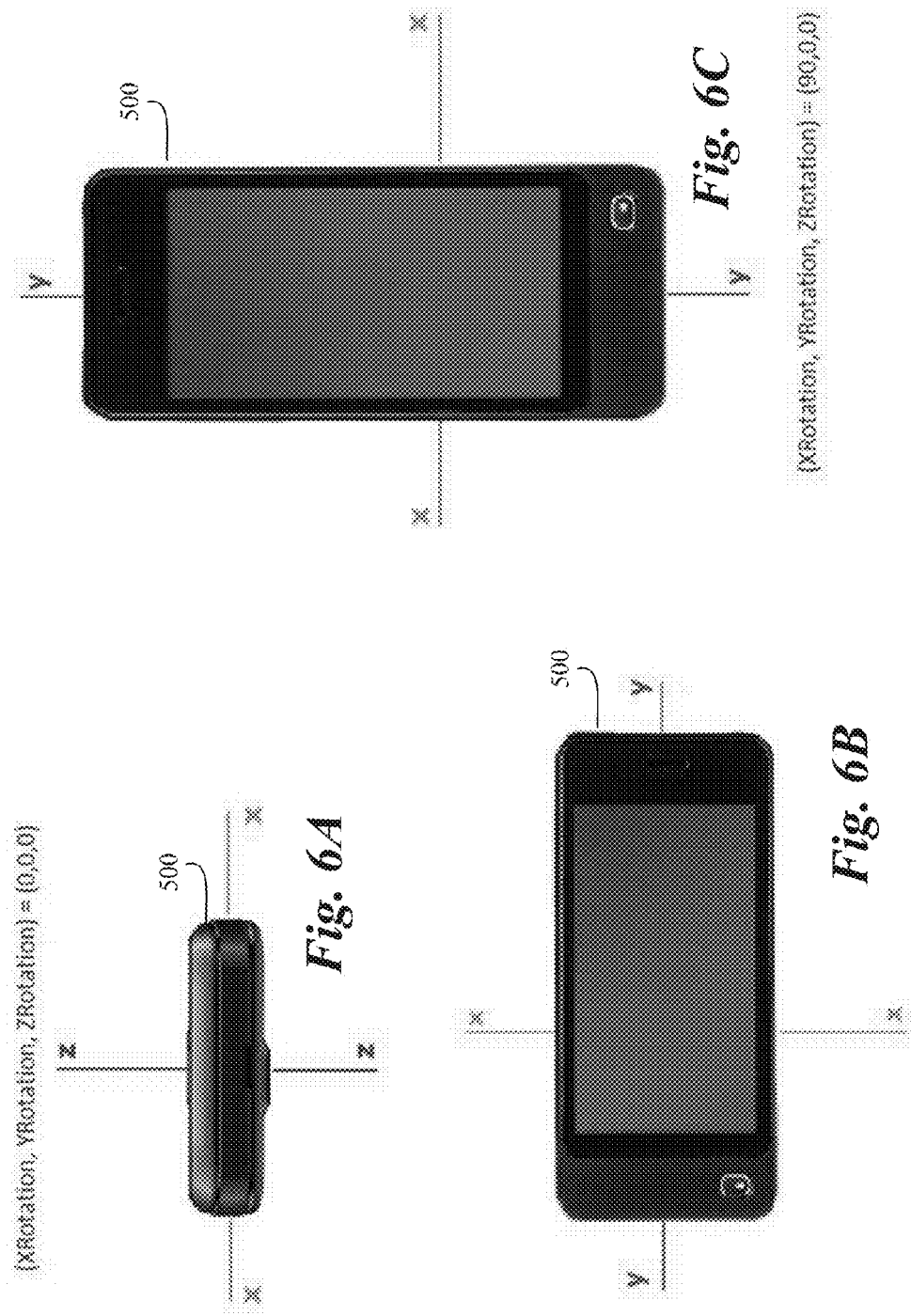

TOUCH SCREEN KEYBOARD DESIGN FOR MOBILE DEVICES

BACKGROUND OF THE INVENTION

Field of the Invention

The present invention is generally related to the field of keyboard designs. More particularly, the present invention is related to a new touch screen keyboard design for mobile devices.

Description

Many mobile devices, such as, but not limited to, smart phones, mobile internet devices (MIDs), Personal Digital Assistants (PDAs), etc. have small displays without having external keyboards. Such devices display a full touch screen keyboard having small buttons for each letter or a combination of several letters on one small button that requires an individual to touch the button several times until the appropriate letter appears. This requires one to move their fingers carefully to touch the correct button to input a letter.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

FIGS. 6A, 6B, and 6C are exemplary illustrations of a mobile device in a non-rotational position and two rotational positions, respectively.

DETAILED DESCRIPTION

Figure 1:
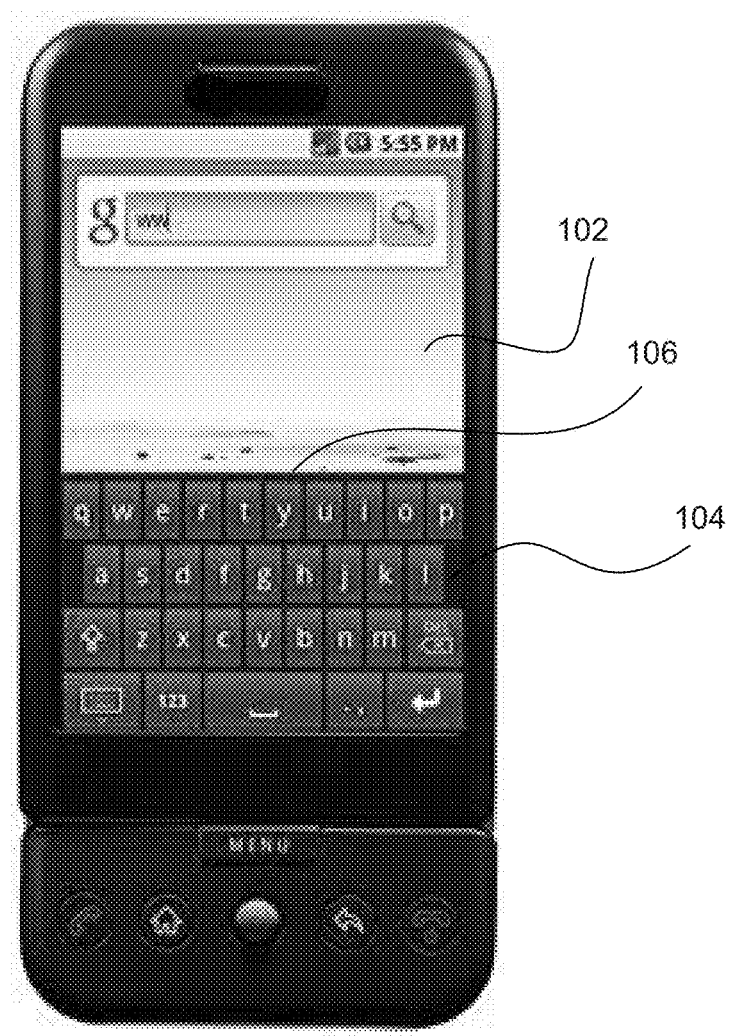
FIG. 1 illustrates a conventional mobile device.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to methods, apparatuses, and articles of manufacture associated with a virtual touch screen keyboard for a mobile device that changes the keyboard layout based on the movement of the mobile device. In embodiments of the present invention, virtual touch screen keyboard layouts provide larger key displays by only displaying a portion of a full keyboard at any given time. In embodiments of the present invention, a sensor may be used to detect the movement of the mobile device. The sensor provides a measurement indicative of the movement of the mobile device to the virtual touch screen keyboard. The virtual touch screen keyboard uses this measurement to determine whether a positive or a negative change in the position of the mobile device has occurred. When a pre-defined positive change in the position of the mobile device occurs, a first virtual keyboard layout may be displayed. When a pre-defined negative change in the position of the mobile device occurs, a second virtual keyboard layout may be displayed. In one embodiment, the first virtual keyboard layout may be the right portion of the virtual keyboard and the second virtual keyboard layout may be the left portion of the virtual keyboard. In an alternative embodiment, the first virtual keyboard layout may be the left portion of the virtual keyboard and the second virtual keyboard layout may be the right portion of the virtual keyboard. Thus, as a user is typing input characters into the mobile device, the virtual touch screen keyboard may receive a measurement from the sensor that is indicative of a change in the position of the mobile device, and if that change in position requires a different virtual keyboard layout, the virtual keyboard will change the virtual keyboard layout accordingly.

In one embodiment, a mobile device may have an accelerometer sensor (also referred to as a gravity sensor), and the accelerometer sensor may be used to detect the movement (i.e., acceleration) of the mobile device. In another embodiment, a mobile device may have a tilt sensor or a rotation sensor, and the tilt sensor or the rotation sensor may be used to detect the movement (i.e., tilt or rotation angle) of the mobile device. Although the present invention is described using an accelerometer, gravity sensor, tilt sensor, or rotation sensor, the invention is not limited to these devices. One skilled in the relevant art(s) would know that other types of devices that are capable of detecting the movement, i.e., acceleration/tilt angle/rotation angle/etc., of the mobile device may be used as well.

Embodiments of the present invention are described as providing two virtual keyboard layouts for one virtual touch screen keyboard. The present invention is not limited to two virtual keyboard layouts for one virtual touch screen keyboard. One skilled in the relevant art(s) would know that more than two virtual keyboard layouts may be implemented by defining additional pre-defined positions of the mobile device for each layout. Also, embodiments of the present invention are described showing exemplary virtual keyboard layouts. The present invention is also not limited to the keyboard layouts presented. One skilled in the relevant art(s) would know that other keyboard layouts may be used without departing from the scope of the present invention. For example, in one keyboard layout, each key may represent two letters, but only one of the letters is displayed based on the movement of the mobile device.

In various embodiments, apparatuses may be endowed with hardware and/or software configured to practice one or more aspects of the above described embodiments of the methods of the present invention. In various embodiments, an article of manufacture with a tangible, non-transitory computer-readable storage medium may be provided with programming instructions configured to cause a processor of the apparatus, in response to the execution of the programming instructions by the processor, to practice one or more aspects of the above described embodiments of the methods of the present invention.

FIG. 1 illustrates a conventional mobile device 100. Mobile device 100 may be a smart phone, a MID (mobile Internet device), or any other small form factor device. Mobile device 100 is shown having a small screen 102 and displaying a conventional full touch screen keyboard 104 comprised of small buttons 106 as an input device. To input a letter, a user must move his or her finger very carefully to exactly touch the small button indicating the letter, making the input experience inconvenient and frustrating for the user.

Embodiments of the present invention take advantage of accelerometers and other sensors, such as, for example, a tilt sensor, a rotation sensor, or any other sensor providing a measurement indicative of a position, currently found in mobile devices to provide a virtual touch screen keyboard that displays a first portion of the virtual touch screen keyboard when the accelerometer/tilt sensor detects a pre-defined first acceleration/tilt angle position of the mobile device and displays a second portion of the virtual touch screen keyboard when the accelerometer/tilt sensor detects a predefined second acceleration/tilt angle position of the mobile device. In other words, the virtual keyboard of a touch screen mobile device may change its keyboard layout by detecting a change in the position of the mobile device. By splitting the keyboard into at least two keyboard layouts, the area of each key in the virtual keyboard layout may be enlarged or at least doubled.

Figure 2:
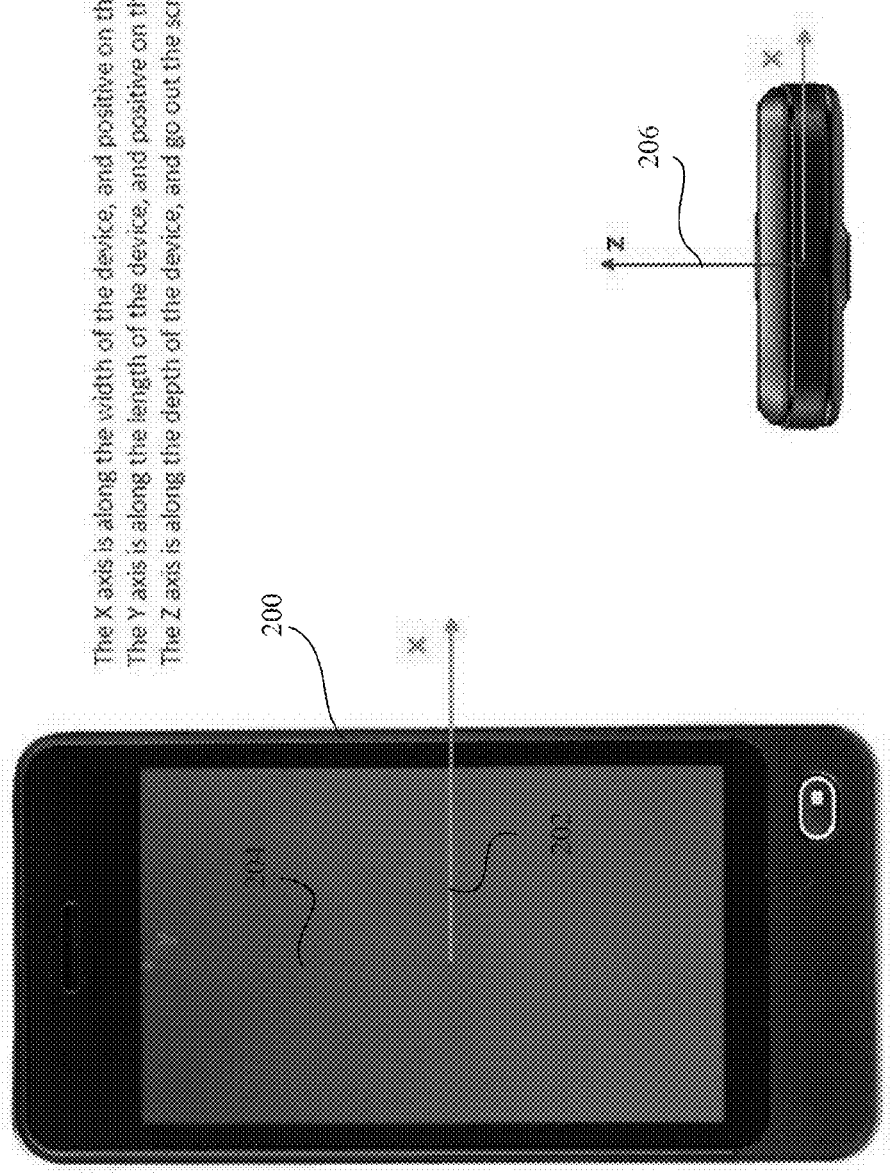
FIG. 2 illustrates a definition of the X,Y,Z axis of a mobile device according to an embodiment of the present invention.

FIG. 2 illustrates a definition of the X,Y,Z axis of a mobile device 200 according to an embodiment of the present invention. Mobile device 200 includes an accelerometer (not explicitly shown). As shown in FIG. 2, an X,Y,Z coordinate system is placed on top of the mobile device 200. The origin of the X,Y,Z coordinate system is where an X-axis 202, a Y-axis 204, and a Z-axis 206 all meet. The X-axis 202 is shown along the width of the mobile device 200. The Y-axis 204 is shown along the length of the mobile device 200. The Z-axis 206 is shown along the depth of the mobile device 200. The X,Y,Z axes, as shown in FIG. 2, represent the relative location of the mobile device 200. In an embodiment of the present invention in which mobile device 200 includes an accelerometer (not explicitly shown), the mobile device 200 will return an acceleration of the device in a direction in which the device has moved in the X,Y,Z axes, represented using triples (X,Y,Z). For example, an acceleration of (2,0,0) indicates an acceleration of 2 in the X-axis direction and no or zero (0) acceleration in the direction of the Y and Z axes.

In one embodiment of the present invention, a mobile device having an accelerometer may change the virtual touch screen keyboard display when an absolute value of the acceleration of the mobile device 200 in the X-axis direction exceeds a pre-defined value (X-Acc). This pre-defined value (X-Acc) may be set as part of an initial set-up process for the mobile device 200. In one embodiment, the pre-defined value (X-Acc) may be set by the manufacturer of the mobile device as the actual X-Acc value or as a default value. In another embodiment, the user of the mobile device may set the pre-defined value (X-Acc). In such an instance, the user may have the ability to set the X-Acc value during an initial set-up of the mobile device 200 as well as the ability to change the setting of the X-Acc value at any time thereafter.

In one embodiment of the present invention, the virtual keyboard layout may be designed in two parts, with both parts comprising the full virtual keyboard. In one embodiment, the portion of the virtual keyboard to be initially displayed may be the virtual keyboard layout that was previously displayed. In another embodiment, the portion of the virtual keyboard to be initially displayed may be the right side of the virtual keyboard. In yet another embodiment, the left side of the virtual keyboard may be initially displayed.

Figure 3A:
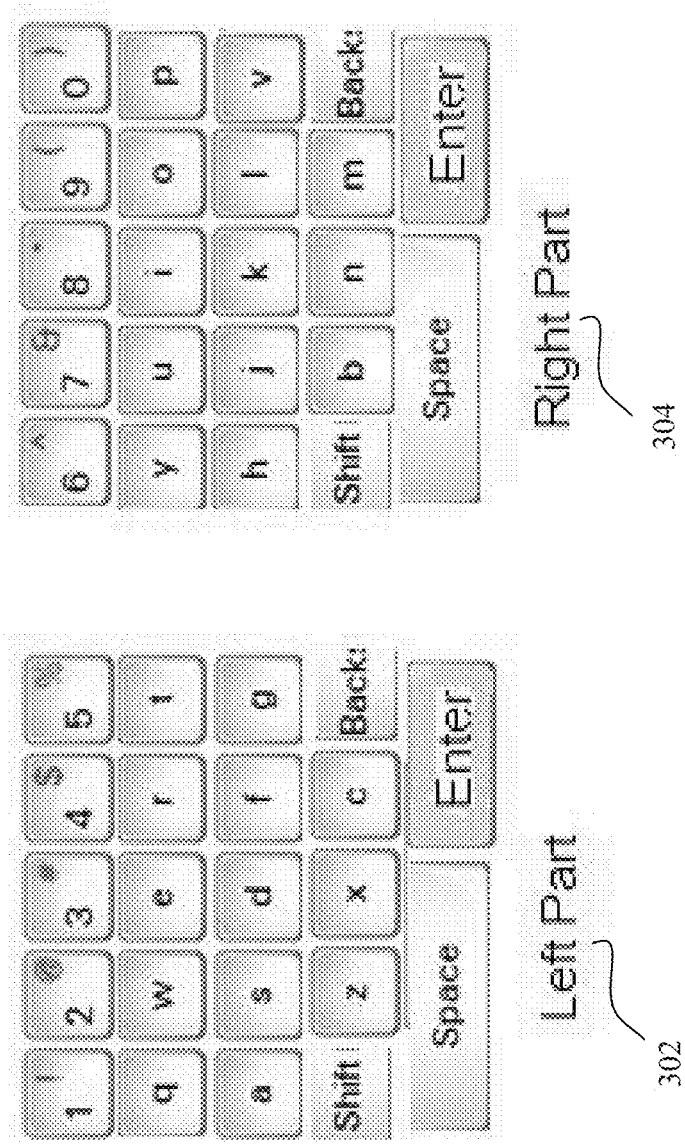
FIGS. 3A and 3B illustrate exemplary right and left virtual keyboard layouts according to embodiments of the present invention.
Figure 3B:
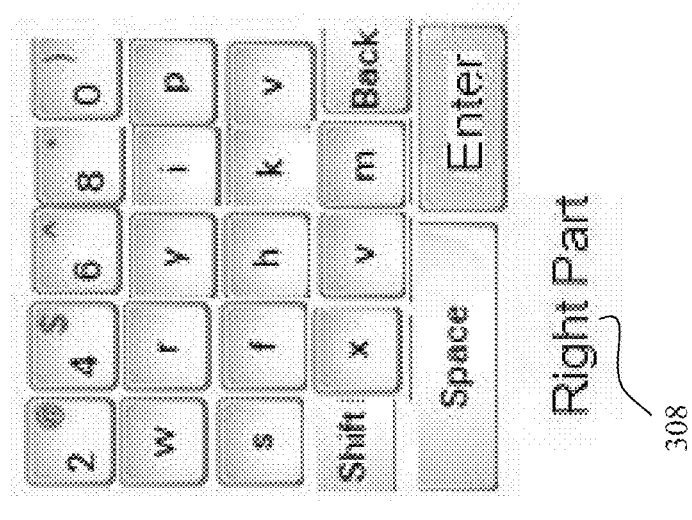

Exemplary right and left virtual keyboard layouts 300 and 305 according to embodiments of the present invention are shown in FIGS. 3A and 3B. FIG. 3A shows one exemplary virtual keyboard 300 comprising two virtual keyboard layouts according to an embodiment of the present invention. Exemplary virtual keyboard 300 includes a left virtual keyboard layout 302 and a right virtual keyboard layout 304. The left virtual keyboard layout 302 is substantially similar to the left side of a conventional keyboard and the right virtual keyboard layout 304 is substantially similar to right side of a conventional keyboard. In other words, the virtual keyboard 300 of FIG. 3A is similar to a conventional keyboard that has been divided down the middle. The Shift, Back, Space, and Enter keys are common to both the left (302) and the right (304) virtual keyboard layouts.

FIG. 3B shows another exemplary virtual keyboard 305 according to an embodiment of the present invention. Exemplary virtual keyboard 305 includes a left virtual keyboard layout 306 and a right virtual keyboard layout 308. The left (306) and right (308) virtual keyboard layouts shown in FIG. 3B provide a different keyboard layout from a conventional keyboard. Here, all odd number keys are displayed on a left virtual keyboard layout 306 and all even number keys are displayed on a right virtual keyboard layout 308. Each column of keys shown is substantially similar to those of a conventional keyboard having the number key at the top of the column. Again, the Shift, Back, Space, and Enter keys are common to both the left (306) and the right (308) virtual keyboards.

Note that the virtual keyboard layouts 302, 304, and 306, 308 are shown as examples. Embodiments of the present invention are not limited to these examples. One skilled in the relevant art(s) would know that other virtual keyboard layouts may be used without departing from the scope of the present invention. As previously indicated, another virtual keyboard layout may be to have each key represent two characters, with one character being displayed for each key when the left virtual keyboard layout is to be displayed and the other character being displayed for each key when the right virtual keyboard layout is to be displayed. In other embodiments, multiple virtual keyboard layouts may be used, wherein a user of the mobile device 200 may select the virtual keyboard layout that best suits the user. In other embodiments of the present invention, more than two virtual keyboard layouts may be used to represent a full keyboard. In this instance, more than one pre-defined value (such as, for example, X1-Acc, X2-Acc, etc.) may be used, depending on the number of virtual keyboard layouts that comprise one complete virtual keyboard.

As previously indicated, embodiments of the present invention provide a virtual touch screen keyboard layout that provides larger key displays by displaying a portion of a virtual keyboard at any given time. In one embodiment, the portion of the virtual keyboard that is displayed may be based on the acceleration of the mobile device. When an application that requires input data from a keyboard is selected by a user of the mobile device, a first portion of the virtual keyboard is displayed to allow the user to begin inputting data (i.e., characters). To display a second portion of the virtual keyboard, the user must tilt or move (accelerate) the mobile device by an amount in which the absolute value of that amount exceeds a pre-defined acceleration value in the X axis direction (X-Acc). For example, a first portion of a virtual touch screen keyboard is being displayed. As a user is typing characters from the first portion of the virtual touch screen keyboard, the mobile device may be tilted or moved, causing the keyboard interface to obtain current readings of the acceleration of the mobile device. When the user wants or needs the second portion of the virtual touch screen keyboard to be displayed in order to type characters from the second portion of the virtual touch screen keyboard, the user must tilt/move the mobile device in a manner that provides a large enough acceleration value in the +X or −X direction to cause the virtual keyboard to change the keyboard display from the first portion of the virtual touch screen keyboard to a second portion of the virtual touch screen keyboard. Thus, based on an absolute value of an acceleration measurement in the X-axis direction that exceeds the pre-defined value of X-Acc, the virtual keyboard layout will be changed to display the second portion of the virtual touch screen keyboard.

Using the virtual touch screen keyboard layout shown in FIG. 3A or FIG. 3B, if the user wants to type the word "d-e-v-i-c-e", the user may tilt the mobile device far enough to the left to have the left portion of the virtual keyboard displayed so the user may type the characters "d-e-". The user may then tilt the mobile device far enough to the right to have the right portion of the virtual keyboard displayed to type the characters "v-i". Then the user may tilt the mobile device far enough back to the left to have the left portion of the virtual keyboard displayed to type the characters "c-e" to complete the word "device".

Figure 4:
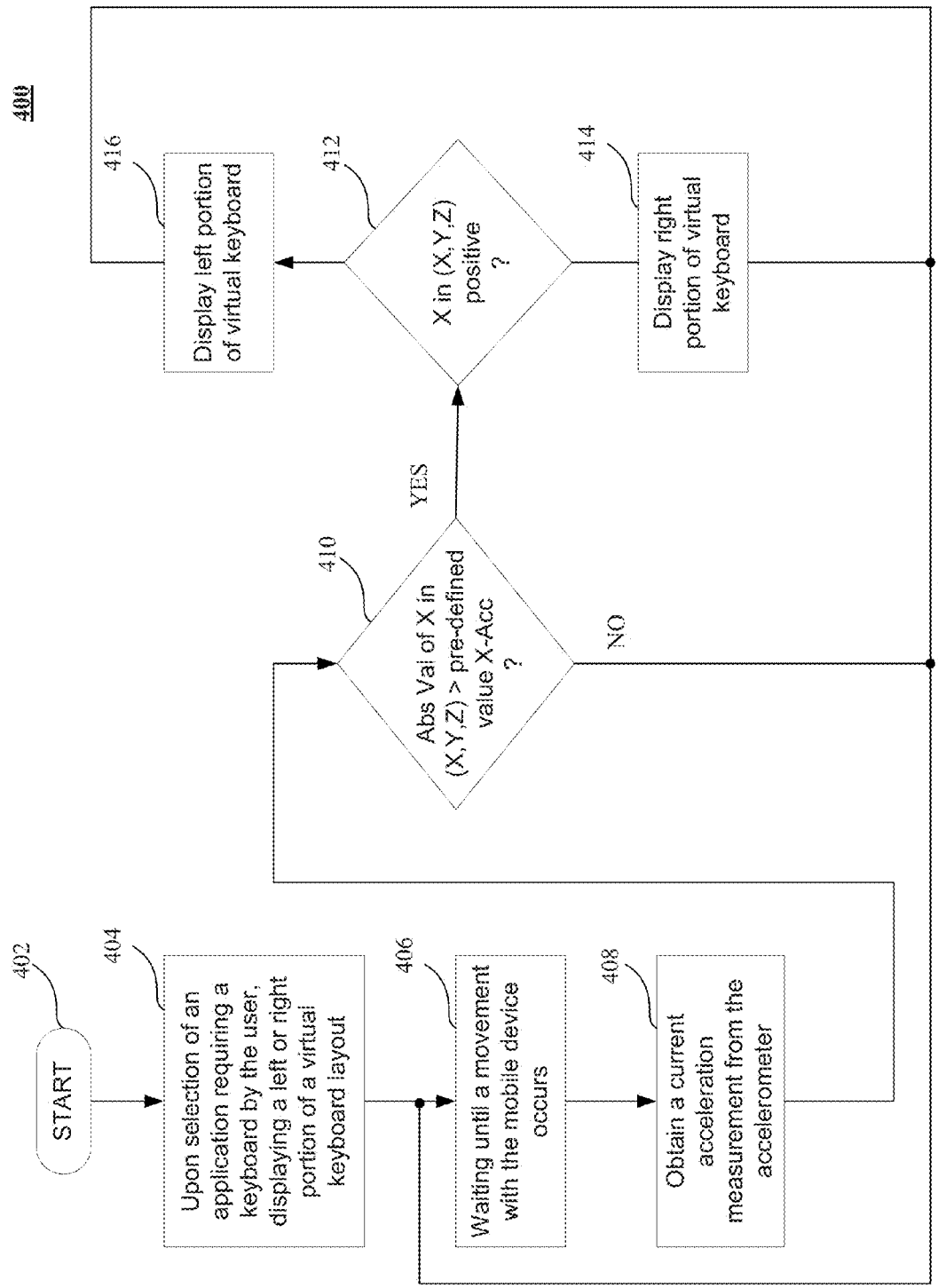
FIG. 4 is a flow diagram describing an exemplary method for changing a display of a touch screen virtual keyboard layout on a mobile device according to an embodiment of the present invention.

FIG. 4 is a flow diagram 400 describing an exemplary method for changing a display of a touch screen virtual keyboard layout on a mobile device according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to block 404.

In block 404, upon the selection of an application requiring a keyboard by the user, a left or right portion of a virtual keyboard layout is displayed. In one embodiment, the virtual keyboard layout displayed is the same portion of a virtual keyboard that was previously or lastly displayed by the mobile device. In another embodiment, the virtual keyboard layout displayed is the left portion of a virtual keyboard. In yet another embodiment of the present invention, the right portion of a virtual keyboard is displayed. The process then proceeds to block 406.

In block 406, the process remains at block 406 until a movement with the mobile device occurs. Upon a movement of the mobile device, the process proceeds to block 408. The movement may include the user tilting the mobile device as well as moving the device mobile device.

In block 408, movement of the device triggers the virtual keyboard of the mobile device to obtain a current acceleration measurement from the accelerometer of the mobile device. The process then proceeds to decision block 410.

In decision block 410, it is determined whether the absolute value of the current X acceleration measurement of the (X,Y,Z) acceleration measurement is larger than the pre-defined value of X-Acc. If the absolute value of the X acceleration measurement is larger than the pre-defined value of X-Acc, then the process proceeds to decision block 412.

In decision block 412, it is determined whether the X acceleration measurement is positive. If the X acceleration measurement is positive, the right portion of the virtual keyboard is displayed. The user is now allowed to input characters displayed on the right portion of the virtual keyboard. The process then proceeds back to block 406 where it remains until another movement of the mobile device is made.

Returning to decision block 412, if the X acceleration measurement is not positive (i.e., negative), then the left portion of the virtual keyboard is displayed. The user is now allowed to input characters displayed on the left portion of the virtual keyboard. The process then proceeds back to block 406, where the process remains until another movement of the mobile device is made.

Returning to decision block 410, if it is determined that the absolute value of the X acceleration measurement is not larger than the pre-defined value of X-Acc, then the movement is not large enough, and the virtual keyboard layout is not changed. The process then proceeds back to block 406, where the process remains until another movement of the mobile device is made.

As previously indicated, other embodiments of a mobile device may include a tilt sensor or a rotation sensor. The tilt sensor or the rotation sensor may also be used to implement embodiments of the present invention. In one embodiment, a tilt sensor or a rotation sensor in a mobile device may detect the tilt or rotation angle (in degrees) by which a user of the mobile device has tilted or rotated the mobile device. In embodiments implementing the tilt sensor or the rotation sensor, the absolute value of a tilt angle or rotation angle that exceeds a pre-determined tilt or rotation angle value may cause the virtual touch screen keyboard layout to be changed.

Figure 5:
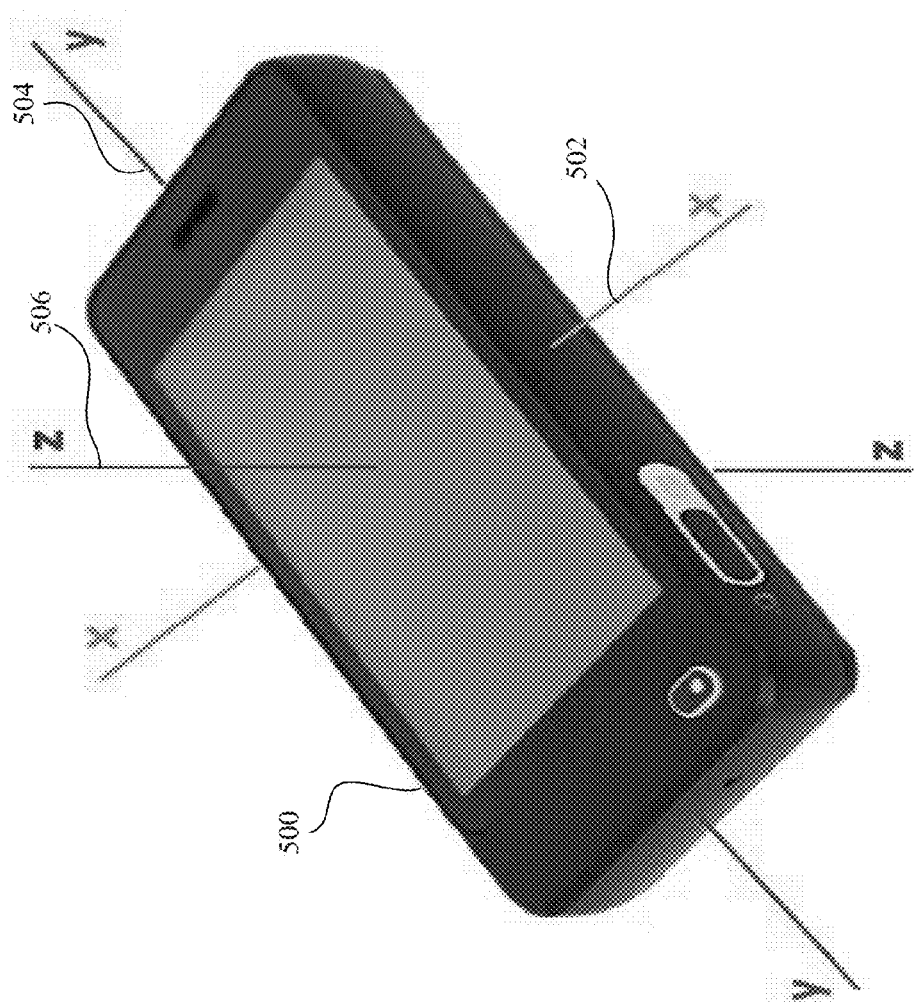
FIG. 5 illustrates a definition of the X,Y,Z axis of a mobile device according to an embodiment of the present invention.

FIG. 5 illustrates a definition of the X,Y,Z axis of a mobile device 500 according to an embodiment of the present invention. FIG. 5 is similar to FIG. 2 except the mobile device of FIG. 5 includes a tilt or rotation sensor (not explicitly shown). As shown in FIG. 5, an X,Y,Z coordinate system is placed on top of the mobile device 500. The origin of the X,Y,Z coordinate system is where an X-axis 502, a Y-axis 504, and a Z-axis 506 all meet. The X-axis 502 is shown along the width of the mobile device 500. The Y-axis 504 is shown along the length of the mobile device 500. The Z-axis 506 is shown along the depth of the mobile device 500. The X,Y,Z axes, as shown in FIG. 5, represent the relative location of the mobile device 500. In an embodiment of the present invention in which the mobile device 500 includes one of a tilt sensor (not explicitly shown) or a rotation sensor (not explicitly shown), the mobile device 500 is capable of providing a tilt angle or rotation angle, respectively, in the direction in which the mobile device has been tilted or rotated, respectively, represented by a triple (XRotation, YRotation, ZRotation). XRotation, YRotation, ZRotation represents the angles measured, starting from the x-axis, y-axis, z-axis, respectively. The values of XRotation, YRotation, ZRotation range from −180 to 180 degrees.

FIGS. 6A, 6B, and 6C are exemplary illustrations of mobile device 500 in a non-rotational position and two rotational positions, respectively. FIG. 6A illustrates a mobile device 500 in which the rotation angle, represented by a triple (0,0,0), is zero. In other words, the XRotation, YRotation, and ZRotation values are all zero, indicating that the mobile device 500 has not been rotated or tilted in any direction. FIG. 6B illustrates a mobile device 500 in which the rotation angle, represented by a triple (90,0,0) has been rotated or tilted 90 degrees in the X-axis only. As shown in FIG. 6B, rotating the XRotation value does not provide a convenient method for inputting characters and changing the keyboard layout. FIG. 6C illustrates a mobile device 500 in which the rotation angle, represented by a triple (90,0,90), has been rotated or tilted 90 degrees in both the X-axis and the Z-axis. As shown in FIG. 6C, rotating the ZRotation (along with the XRotation) also does not provide a convenient method for inputting characters and changing the keyboard layout. Thus, as can be seen from each of FIGS. 6A, 6B, and 6C, the rotation of mobile device 500 about the X-axis or the Z-axis does not provide a convenient method of inputting characters from a virtual keyboard while having the ability to change the virtual keyboard display based on the rotation angle.

Figures 7A, 7B:
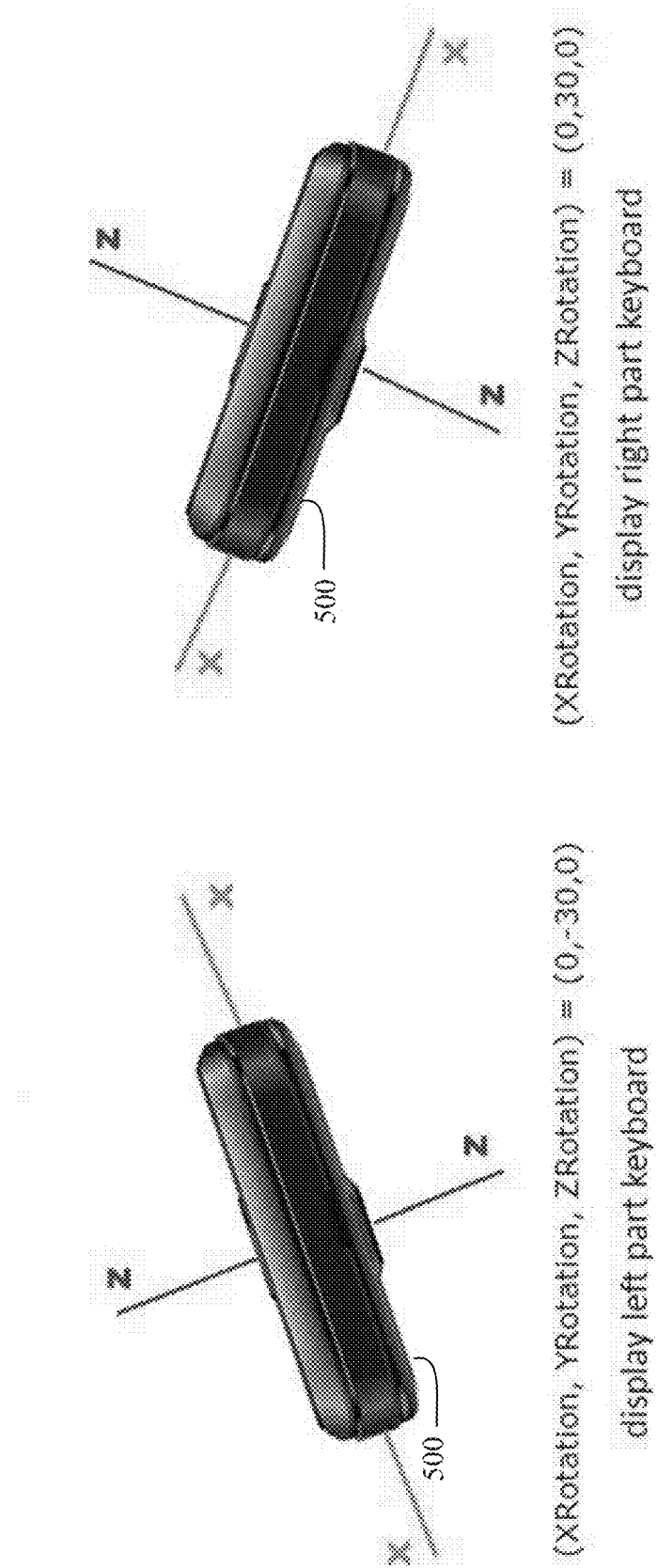
FIGS. 7A and 7B are exemplary illustrations of a mobile device being rotated about the Y-axis according to embodiments of the present invention.

FIGS. 7A and 7B are exemplary illustrations of mobile device 500 being rotated about the Y-axis according to embodiments of the present invention. As shown in FIGS. 7A and 7B, rotating the mobile device about the Y-axis provides a convenient method of inputting characters from a virtual keyboard while rotating the mobile device 500 to effect a change in the virtual keyboard display. In FIG. 7A, the rotation angle of mobile device 500, shown as triple (0,−30,0), is −30 degrees for the Y-axis only and in FIG. 7B, the rotation angle of mobile device 500, shown as triple (0,30,0), is 30 degrees for the Y-axis only. In other words, the X-axis and the Z-axis are zero. By using the rotation of the Y-axis (and ignoring the X-axis and the Z-axis), one can easily change the virtual touch screen keyboard layout based on a change in YRotation (the rotation of the Y-axis). A rotation of the mobile device 500 about the Y-axis that results in a negative YRotation value may display the left portion of the virtual touch screen keyboard and a rotation of the mobile device 500 about the Y-axis that results in a positive YRotation value may display the right portion of the virtual touch screen keyboard.

In one embodiment of the present invention, a mobile device having a tilt or rotation sensor may change the virtual keyboard display when an absolute value of the tilt or rotation of the mobile device 500 about the Y-axis (YRotation of (XRotation, YRotation, ZRotation)) exceeds a pre-defined value (YRotation_Pre). This pre-defined value (YRotation_Pre) may be set as part of an initial set-up process for the mobile device 500. In one embodiment, the pre-defined value (YRotation_Pre) may be set by the manufacturer of the mobile device 500 as the actual YRotation_Pre value or as a default value. In another embodiment, the user of the mobile device 500 may set the pre-defined value (YRotation_Pre). In such an instance, the user may have the ability to set the YRotation_Pre value during an initial set-up of the mobile device 500 as well as the ability to change the setting of the YRotation_Pre value at any time thereafter.

Figure 8:
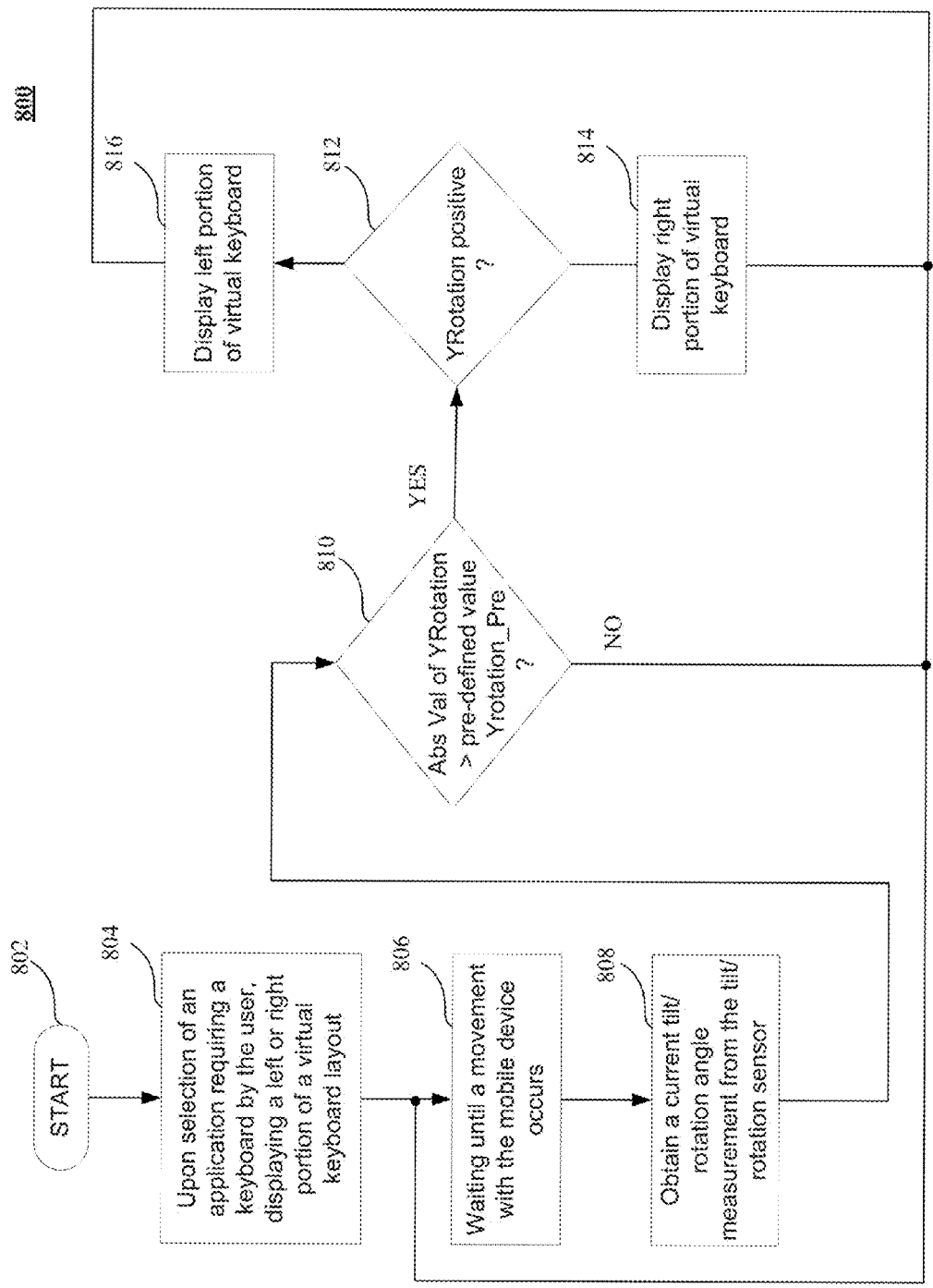
FIG. 8 is a flow diagram describing an exemplary method for changing a display of a touch screen virtual keyboard layout on a mobile device according to an embodiment of the present invention.

FIG. 8 is a flow diagram 800 describing an exemplary method for changing a display of a touch screen virtual keyboard layout on a mobile device according to an embodiment of the present invention. The invention is not limited to the embodiment described herein with respect to flow diagram 800. Rather, it will be apparent to persons skilled in the relevant art(s) after reading the teachings provided herein that other functional flow diagrams are within the scope of the invention. The process begins with block 802, where the process immediately proceeds to block 804.

In block 804, upon the selection of an application requiring a keyboard by the user, a left or right portion of a virtual keyboard layout is displayed. In one embodiment, the virtual keyboard layout displayed is the same portion of a virtual keyboard that was previously or lastly displayed by the mobile device. In another embodiment, the virtual keyboard layout displayed by the mobile device is the left portion of a virtual keyboard. In yet another embodiment of the present invention, the right portion of a virtual keyboard is displayed. The process then proceeds to block 806.

In block 806, the process remains at block 806 until a movement with the mobile device occurs. Upon a movement of the mobile device, the process proceeds to block 808. The movement may include the user tilting or rotating the mobile device about the Y-axis.

In block 808, movement of the mobile device triggers the virtual keyboard of the mobile device to obtain a current tilt or rotation angle measurement from the tilt or rotation sensor of the mobile device. The process then proceeds to decision block 810.

In decision block 810, it is determined whether the absolute value of the current YRotation measurement in the tilt/rotation measurement value (XRotation, YRotation, ZRotation) from the tilt/rotation sensor is larger than the pre-defined value YRotation_Pre. If the absolute value of the YRotation from the (XRotation, YRotation, ZRotation) tilt/rotation measurement is larger than the pre-defined value of YRotation_Pre, then the process proceeds to decision block 812.

In decision block 812, it is determined whether the YRotation measurement value is positive. If the YRotation measurement value is positive, the right portion of the virtual keyboard (a right portion keyboard layout) is displayed. The user is now allowed to input characters displayed on the right portion of the virtual keyboard. The process then proceeds back to block 806 where the process remains until another movement of the mobile device is detected.

Returning to decision block 812, if the YRotation measurement value is not positive (i.e., negative), then the left portion of the virtual keyboard (a left portion keyboard layout) is displayed. The user is now allowed to input characters displayed on the left portion of the virtual keyboard. The process then proceeds back to block 806, where the process remains until another movement of the mobile device is detected.

Returning to decision block 810, if it is determined that the absolute value of the YRotation measurement is not larger than the pre-defined YRotation_Pre value, then the movement is not large enough, and the virtual keyboard layout is not changed. The process then proceeds back to block 806 where the process remains until another movement of the mobile device is detected.

Figure 9:
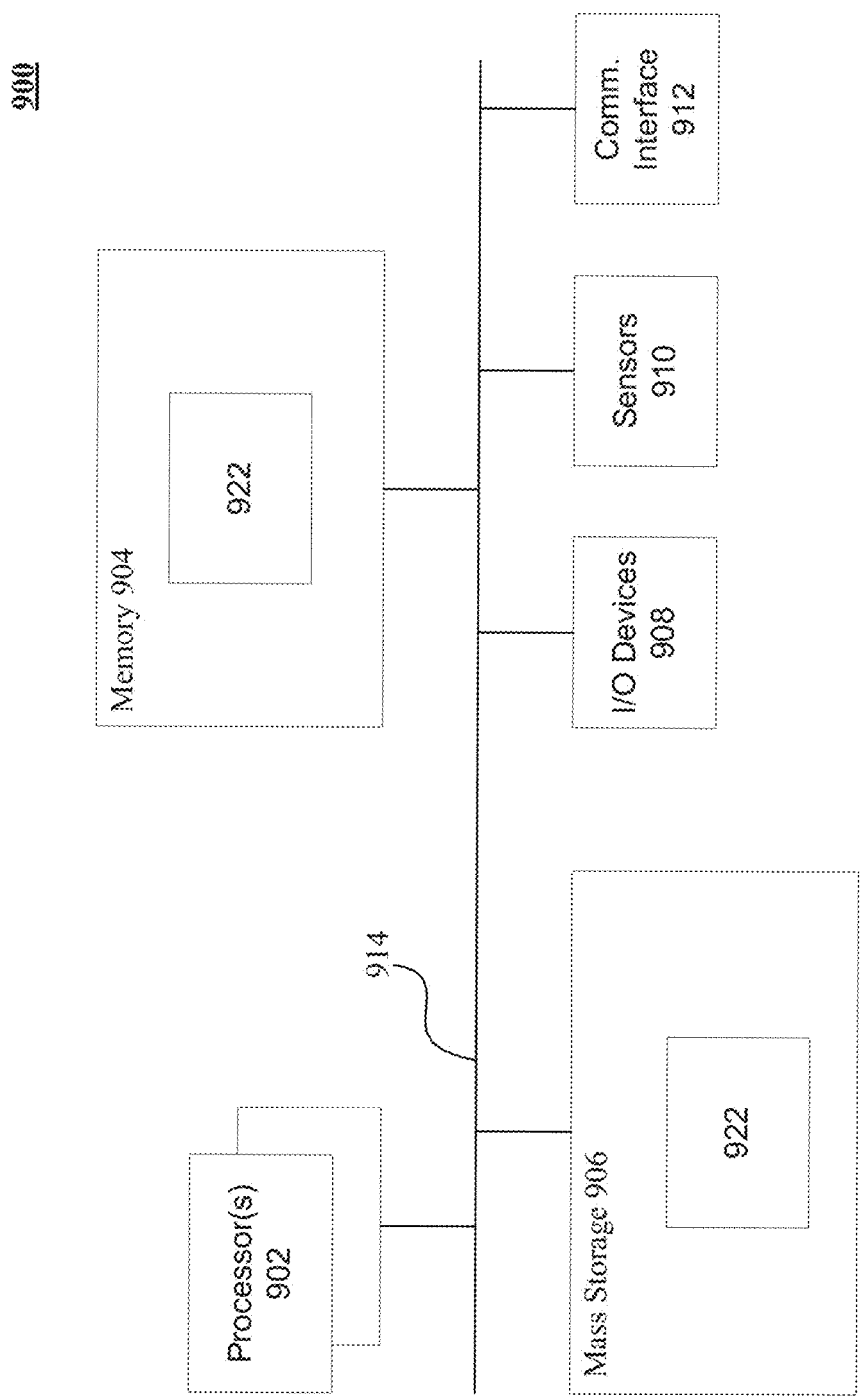
FIG. 9 is a block diagram illustrating a mobile device directed to an exemplary computer system in which certain aspects of embodiments of the present invention may be implemented.

Embodiments of the present invention may be implemented using hardware, software, or a combination thereof and may be implemented in a mobile device, such as mobile devices 200 or 500, directed toward one or more computer systems capable of carrying out the functionality described here. An example implementation of a computer system 900 for a mobile device is shown in FIG. 9. Various embodiments of mobile devices 200 or 500 are described in terms of this exemplary computer system 900. After reading this description, it will be apparent to a person skilled in the relevant art how to implement the invention using other computer systems and/or computer architectures for mobile devices 200 or 500.

Computer system 900 includes one or more processors or processor cores 902, and system memory 904. For the purpose of this application, including the claims, the terms "Processor" and "processor cores" may be considered synonymous, unless the context clearly requires otherwise. Additionally, computing system 900 includes mass storage devices 906 (such as a diskette, hard drive, compact disc read only memory (CDROM) and so forth), input/output devices 908 (such as a display, virtual touch screen keyboard, cursor control, and so forth), sensors 910 (such as an accelerometer, tilt sensor, rotation sensor and so forth), and communication interfaces 912 (such as network interface cards and so forth). The elements are coupled to each other via system bus 914, which represents one or more buses. In the case of multiple buses, they are bridged by one or more bus bridges (not shown).

Each of these elements performs it conventional functions known in the art and/or as described above with respect to embodiments of the present invention. In particular, system memory 904 and mass storage 906 may be employed to store a working copy and a permanent copy of the programming instructions (922) implementing the various components of the present invention. The various components may be implemented by assembler instructions supported by processor(s) 902 or high-level languages, such as, for example, C, that can be compiled into such instructions.

The permanent copy of the programming instructions may be placed into permanent storage 906 in the factory, or in the field, through, for example, a distribution medium (not shown), such as a compact disc (CD), or through communication interface 912 (from a distribution server (not shown)).

The virtual keyboard of input/output devices 908 includes an interface (not shown) that communicates with sensors 910 to obtain the position of mobile device 200, 500 as described above.

The constitution of elements 902-914 are known in the art, and accordingly will not be further described.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for a virtual touch screen keyboard, comprising:
    determining, by a mobile device, a first portion of a virtual touch screen keyboard comprising a first plurality of letters and a second portion of the virtual touch screen keyboard comprising a second plurality of letters, wherein each letter of the second plurality of letters is not in the first plurality of letters;
    waiting for a movement of a mobile device;
    upon the movement of the mobile device, receiving, from a sensor of the mobile device, a measurement representing a current position of the mobile device;
    determining whether an absolute value of the received measurement is greater than a pre-defined value;
    determining whether a value of the received measurement is positive;
    if the value of the received measurement is not positive, displaying, in response to a determination that the absolute value of the received measurement is greater than the pre-defined value and in response to a determination that the value of the received measurement is not positive, the first portion of the virtual touch screen keyboard to allow a user to input characters from the first portion of the virtual touch screen keyboard and not the second portion of the virtual touch screen keyboard, wherein the area of each letter of the first plurality of letters is larger than the area of a letter for a conventional touch screen keyboard displaying an entire keyboard; and
    if the value of the received measurement is positive, displaying, in response to a determination that the absolute value of the received measurement is greater than the pre-defined value and in response to a determination that the value of the received measurement is positive, the second portion of the virtual touch screen keyboard to allow a user to input characters from the second portion of the virtual touch screen keyboard and not the first portion of the virtual touch screen keyboard, wherein the area of each letter of the second plurality of letters is larger than the area of a letter for a conventional touch screen keyboard displaying an entire keyboard,
    wherein the first portion of the virtual touch screen keyboard and the second portion of the virtual touch screen keyboard are determined prior to receipt of the measurement.

2. The method of claim 1, wherein if the absolute value of the received measurement is not greater than the pre-defined value, continuing to wait for a movement of the mobile device.

3. The method of claim 1, wherein prior to waiting for a movement of a mobile device, displaying a keyboard layout upon a user selection of an application requiring input from a keyboard.

4. The method of claim 3, wherein the keyboard layout displayed is the same as a last displayed keyboard layout.

5. The method of claim 3, wherein the keyboard layout displayed is the first portion of the virtual touch screen keyboard.

6. The method of claim 3, wherein the keyboard layout displayed is the second portion of the virtual touch screen keyboard.

7. The method of claim 1, wherein the sensor comprises an accelerometer, and the measurement representing the position of the mobile device comprises an acceleration measurement.

8. The method of claim 7, wherein the acceleration measurement comprises X, Y, and Z acceleration components, wherein only the X acceleration component is used to determine whether the pre-defined value is exceeded.

9. The method of claim 1, wherein the sensor comprises a tilt sensor, and the measurement representing the position of the mobile device comprises a tilt angle measurement.

10. The method of claim 9, wherein the tilt sensor measurement comprises XRotation, YRotation, and ZRotation components, wherein only the YRotation component is used to determine whether the pre-defined value is exceeded.

11. The method of claim 1, wherein the first portion of the virtual touch screen keyboard and the second portion of the virtual touch screen keyboard each comprise one half of the virtual touch screen keyboard, and wherein the area of a displayed key for the first portion or the second portion is double the area of a key for a conventional touch screen keyboard displaying an entire keyboard.

12. The method of claim 1, wherein the sensor comprises a rotation sensor, and the measurement representing the position of the mobile device comprises a rotation angle measurement.

13. The method of claim 12, wherein the rotation sensor measurement comprises XRotation, YRotation, and ZRotation components, wherein only the YRotation component is used to determine whether the pre-defined value is exceeded.

14. An article of manufacture comprising:
a tangible, non-transitory processor-readable storage medium; and
a plurality of programming instructions, configured to cause a processor, in response to execution of the programming instructions by the processor, to perform operations including
determining a first portion of a virtual touch screen keyboard comprising a first plurality of letters and a second portion of the virtual touch screen keyboard comprising a second plurality of letters, wherein each letter of the second plurality of letters is not in the first plurality of letters;
waiting for a movement of a mobile device;
upon the movement of the mobile device, receiving, from a sensor of the mobile device, a measurement representing a current position of the mobile device;
determining whether an absolute value of the received measurement is greater than a pre-defined value;
determining whether a value of the received measurement is positive;
if the value of the received measurement is not positive, displaying, in response to a determination that the absolute value of the received measurement is greater than the pre-defined value and in response to a determination that the value of the received measurement is not positive, the first portion of the virtual touch screen keyboard to allow a user to input characters from the first portion of the virtual touch screen keyboard and not the second portion of the virtual touch screen keyboard, wherein the area of each letter of the first plurality of letters is larger than the area of a letter for a conventional touch screen keyboard displaying an entire keyboard; and
if the value of the received measurement is positive, displaying, in response to a determination that the absolute value of the received measurement is greater than the pre-defined value and in response to a determination that the value of the received measurement is positive, the second portion of the virtual touch screen keyboard to allow a user to input characters from the second portion of the virtual touch screen keyboard and not the first portion of the virtual touch screen keyboard, wherein the area of each letter of the second plurality of letters is larger than the area of a letter for a conventional touch screen keyboard displaying an entire keyboard, wherein the first portion of the virtual touch screen keyboard and the second portion of the virtual touch screen keyboard are determined prior to receipt of the measurement.

15. The article of claim 14, wherein if the absolute value of the received measurement is not greater than the pre-defined value, further causing the processor to perform operations including continuing to wait for a movement of the mobile device.

16. The article of claim 14, wherein prior to waiting for a movement of a mobile device, further causing the processor to perform operations including displaying a keyboard layout upon a user selection of an application requiring input from a keyboard.

17. The article of claim 16, wherein the keyboard layout displayed is the same as a last displayed keyboard layout.

18. The article of claim 16, wherein the keyboard layout displayed is the first portion of the virtual touch screen keyboard.

19. The article of claim 16, wherein the keyboard layout displayed is the second portion of the virtual touch screen keyboard.

20. The article of claim 14, wherein the sensor comprises an accelerometer, and the measurement representing the position of the mobile device comprises an acceleration measurement.

21. The article of claim 20, wherein the acceleration measurement comprises X, Y, and Z acceleration components, wherein only the X acceleration component is used to determine whether the pre-defined value is exceeded.

22. The article of claim 14, wherein the sensor comprises a tilt sensor, and the measurement representing the position of the mobile device comprises a tilt angle measurement.

23. The article of claim 22, wherein the tilt sensor measurement comprises XRotation, YRotation, and ZRotation components, wherein only the YRotation component is used to determine whether the pre-defined value is exceeded.

24. The article of claim 14, wherein the sensor comprises a rotation sensor, and the measurement representing the position of the mobile device comprises a rotation angle measurement.

25. The article of claim 24, wherein the rotation sensor measurement comprises XRotation, YRotation, and ZRotation components, wherein only the YRotation component is used to determine whether the pre-defined value is exceeded.

26. The article of claim 14, wherein the first portion of the virtual touch screen keyboard and the second portion of the virtual touch screen keyboard each comprise one half of the virtual touch screen keyboard, and wherein the area of a displayed key for the first portion or the second portion is double the area of a key for a conventional touch screen keyboard displaying an entire keyboard.

27. An apparatus comprising:
a mobile device having a sensor, wherein when the mobile device moves, the sensor to provide a virtual touch screen keyboard with a measurement representing the position of the mobile device, wherein the virtual touch screen keyboard to determine whether an absolute value of the received measurement is greater than a pre-defined value and to determine whether a value of the received measurement is positive;
if the value of the received measurement is not positive, the virtual touch screen to display, in response to a determination that the absolute value of the received measurement is greater than the pre-defined value and in response to a determination that the value of the received measurement is not positive, a first portion of the virtual touch screen keyboard to allow a user to input characters from the first portion of the virtual touch screen keyboard and not a second portion of the virtual touch screen keyboard, wherein the area of each letter of the first plurality of letters is larger than the area of a letter for a conventional touch screen keyboard displaying an entire keyboard; and if the value of the received measurement is positive, the virtual touch screen to display, in response to a determination that the absolute value of the received measurement is greater than the pre-defined value and in response to a determination that the value of the received measurement is positive, the second portion of the virtual touch screen keyboard to allow a user to input characters from the second portion of the virtual touch screen keyboard and not the first portion of the virtual touch screen keyboard, wherein the area of each letter of the second plurality of letters is larger than the area of a letter for a conventional touch screen keyboard displaying an entire keyboard, wherein the first portion of the virtual touch screen keyboard comprises a first plurality of letters and the second portion of the virtual touch screen keyboard comprises a second plurality of letters, wherein each letter of the second plurality of letters is not in the first plurality of letters, and wherein the mobile device is to determine the first portion of the virtual touch screen keyboard and the second portion of the virtual touch screen keyboard prior to receipt of the measurement.

28. The apparatus of claim 27, wherein the sensor comprises an accelerometer and the measurement representing the position of the mobile device comprises an acceleration measurement, wherein the acceleration measurement comprises X, Y, and Z acceleration components, and wherein only the X acceleration component is used to determine whether the pre-defined value is exceeded.

29. The apparatus of claim 27, wherein the sensor comprises a tilt sensor or a rotation sensor and the measurement representing the position of the mobile device comprises a tilt angle or rotation angle measurement, wherein the tilt angle or rotation angle measurement comprises XRotation, YRotation, and ZRotation components, and wherein only the YRotation component is used to determine whether the pre-defined value is exceeded.

30. The apparatus of claim 27, wherein the first portion of the virtual touch screen keyboard and the second portion of the virtual touch screen keyboard each comprise one half of the virtual touch screen keyboard, and wherein the area of a displayed key for the first portion or the second portion is double the area of a key for a conventional touch screen keyboard displaying an entire keyboard.

\* \* \* \* \*